United States Patent
Watkins, Jr. et al.

(10) Patent No.: US 8,251,819 B2
(45) Date of Patent: Aug. 28, 2012

(54) SENSOR ERROR REDUCTION IN MOBILE DEVICE BASED INTERACTIVE MULTIPLAYER AUGMENTED REALITY GAMING THROUGH USE OF ONE OR MORE GAME CONVENTIONS

(75) Inventors: Oliver Watkins, Jr., Toronto (CA); Yousuf Chowdhary, Maple (CA); Jeffrey Brunet, Richmond Hill (CA); Ravinder Sharma, Richmond Hill (CA)

(73) Assignee: XMG Studio, Toronto (CA)

( * ) Notice: Subject to any disclaimer, the term of this patent is extended or adjusted under 35 U.S.C. 154(b) by 22 days.

(21) Appl. No.: 13/045,484

(22) Filed: Mar. 10, 2011

(65) Prior Publication Data

US 2012/0015730 A1    Jan. 19, 2012

Related U.S. Application Data

(60) Provisional application No. 61/399,837, filed on Jul. 19, 2010.

(51) Int. Cl.
*G06F 17/00* (2006.01)
(52) U.S. Cl. .......................................................... 463/36
(58) Field of Classification Search ............... 463/36–38, 463/40, 42, 43
See application file for complete search history.

(56) References Cited

U.S. PATENT DOCUMENTS

| | | | |
|---|---|---|---|
| 6,308,565 B1 * | 10/2001 | French et al. | 73/379.04 |
| 6,765,726 B2 * | 7/2004 | French et al. | 359/630 |
| 7,791,808 B2 * | 9/2010 | French et al. | 359/630 |
| 7,864,168 B2 * | 1/2011 | French | 345/204 |
| 8,083,646 B2 * | 12/2011 | Chapa et al. | 482/8 |
| 2010/0149347 A1 * | 6/2010 | Kim et al. | 348/207.1 |

* cited by examiner

*Primary Examiner* — Ronald Laneau
(74) *Attorney, Agent, or Firm* — Gard & Kaslow LLP

(57) ABSTRACT

Interactive multiplayer augmented reality game play is enhanced in a mobile device used in such game play by establishing a virtual world coordinate system based on one or more game conventions and by reducing device sensor error before, during or after game play using one or more such game conventions.

20 Claims, 9 Drawing Sheets

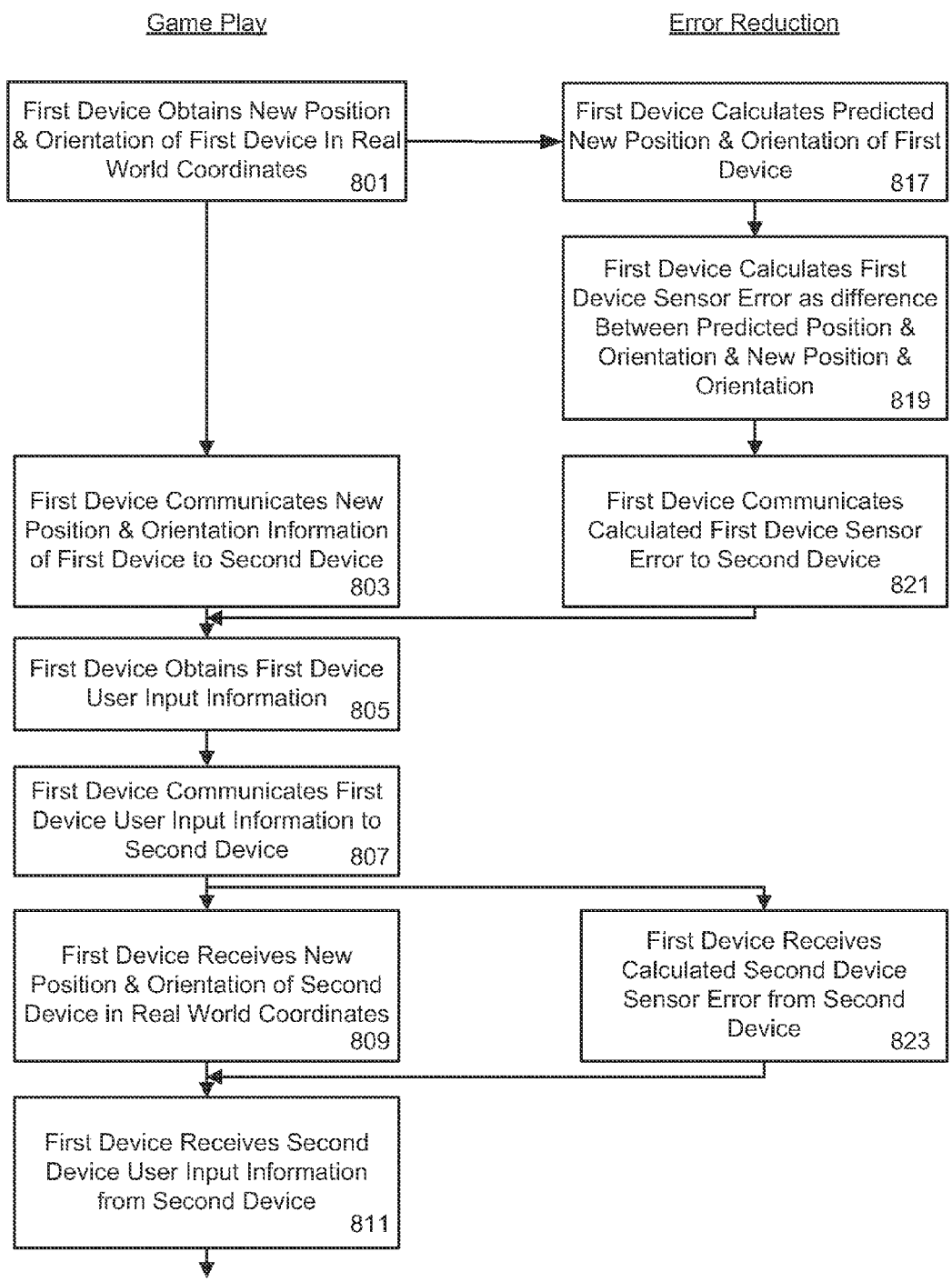

SENSOR ERROR REDUCTION IN MOBILE DEVICE BASED INTERACTIVE MULTIPLAYER AUGMENTED REALITY GAMING THROUGH USE OF ONE OR MORE GAME CONVENTIONS

CROSS-REFERENCE TO RELATED APPLICATIONS

This application claims the benefit of U.S. Provisional Patent Application No. 61/399,837 filed on Jul. 19, 2010 and entitled "Method and Systems for Multiplayer Relative Positioning in Mobile Device based Augmented Reality Games," which is incorporated herein by reference in its entirety.

BACKGROUND OF THE INVENTION

1. Field of the Invention

The present invention relates generally to reducing device sensor error in mobile devices used for augmented reality gaming.

2. Description of the Prior Art

Video games (and other electronic games generally) have become increasingly popular in the modern world. Such games have evolved from running on large, standalone machines located in commercial gaming arcades to small game consoles in homes to personal computers (PCs) and now even handheld computing devices. With the advent of mobile computing devices such as cellular telephone based smartphones, mobile gameplay has become increasingly common.

Gameplay can be defined as any activity where a player (or user) interacts with game specific entities for a unique experience or challenge. Usually game rules (or mechanics) constrain what activities comprise gameplay for a given game, and game conventions enable the unique experiences and challenges presented. In video games, game specific entities might include virtual characters or environments, or even entire virtual worlds. Multiplayer gameplay requires transparent and fair rules, challenge-enabling game conventions, and two or more players represented by game specific entities. This allows each player of a multiplayer game to interact in a meaningful way. A new form of interactive multiplayer game uses augmented reality techniques.

With origins in the military "heads-up display" technology, augmented reality games seek to combine a player's surrounding physical world with superimposed simulated game generated elements (or game specific entities) in an entirely new gaming environment. Such augmented reality game environments typically display some portion of a game player's surrounding physical, real-world environment, obtained via a local video camera feed, onto a physical display along with various game generated elements such as targets and game characters superimposed on the display. This essentially blends the display of the surrounding real-world environment with the game generated elements into a uniform gaming experience.

However, one challenge with running interactive multiplayer augmented reality games on mobile devices is the games ability to keep track of where each of the players is located in the gaining environment and what (if any) actions taken by one player affect the play of (or should be shown on a display of) another player. While not difficult in the completely simulated virtual worlds of previous game environments, this has been a challenge for multiplayer augmented reality game environments running on mobile devices. This is because each mobile device is independently running the game without being able to view the surrounding real world environment of the players, while still keeping track of players and game specific entities in that space. This is in addition to any possible visual effects resulting from actions taken by the player or game entities which must be coordinated such that the virtual world appears to coincide with the real world. Further, these challenges are exacerbated by the mobile devices' sensors, which can become increasingly inaccurate as they are used.

What is needed, therefore, is an improved way to track player activity and game action in a mobile device based interactive multiplayer game environment from within the mobile device itself, while reducing the sensor errors that typically occur.

SUMMARY

In one example is a method performed by a first device operating in an interactive augmented reality game environment with a second device, the method comprising: constructing in the first device a virtual world coordinate system of the augmented reality game environment, the virtual world coordinate system based on an initial position and orientation of the first device in a real world coordinate system obtained from sensors in the first device and an initial position and orientation of the second device in the real world coordinate system obtained from sensors in the second device and received in a communication from the second device to the first device, the initial position and orientation of the first device and the initial position and orientation of the second device each obtained white users of the first device and the second device perform a first game convention with each other; displaying on a display of the first device any first device actions and any second device actions occurring within a field of view of the display of the first device, the first device actions based on any user input information of the first device and a new position and orientation of the first device in the real world coordinate system obtained from sensors in the first device, the second device actions based on any user input information of the second device and a new position and orientation of the second device in the real world coordinate system obtained from sensors in the second device and received in a communication from the second device to the first device; and directing the user of the first device to perform a second game convention if a sensor error of the first device or a sensor error of the second device exceeds a predefined limit Information presented to the user is displayed in a camera view coordinate system constructed within each device using each device's position, orientation, and field of view in their respective virtual world coordinate system.

In another example is a non-transitory computer readable medium containing programming code executable by a processor, the programming code configured to perform a method in a first device operating in an interactive augmented reality game environment with a second device, the method comprising: constructing in the first device a virtual world coordinate system of the augmented reality game environment, the virtual world coordinate system based on an initial position and orientation of the first device in a real world coordinate system obtained from sensors in the first device and an initial position and orientation of the second device in the real world coordinate system obtained from sensors in the second device and received in a communication from the second device to the first device, the initial position and orientation of the first device and the initial position and orientation of the second device each obtained while users of the first device and the second device perform a first game convention with each other; displaying on a display of the first device any first device actions and any second device actions occurring within a field of view of the display of the first device, the first device actions based on any user input information of the first device and a new position and orientation of the first device in the real world coordinate system obtained from sensors in the first device, the second device actions based on any user input information of the second device and a new position and orientation of the second device in the real world coordinate system obtained from sensors in the second device and received in a communication from the second device to the first device; and directing the user of the first device to perform a second game convention if a sensor error of the first device or a sensor error of the second device exceeds a predefined limit.

In still another example is a method performed by a first device operating in an interactive augmented reality game environment with a second device, the method comprising: directing a user of the first device to perform a first game convention wherein the first game convention is a face off game convention with a user of the second device; obtaining an initial position and orientation of the first device in urea world coordinate system from sensors located in the first device; receiving at the first device from the second device a communicated initial position and orientation of the second device in the real world coordinate system obtained from sensors located in the second device; confirming performance by the user of the first device of the face off game convention by comparing the initial position and orientation of the first device to the initial position and orientation of the second device; constructing in the first device a virtual world coordinate system of the interactive augmented reality game environment based on the initial position and orientation of the first device and the initial position and orientation of the second device; obtaining a new position and orientation of the first device in the real world coordinate system from the sensors located in the first device; obtaining user input information of the first device; receiving at the first device from the second interactive game device a communicated new position and orientation of the second device in the real world coordinate system obtained from the sensors located in the second device; receiving at the first device from the second device communicated user input information of the second device; identifying any first device actions occurring within a field of view of the first device based on the new position and orientation of the first device and the user input information of the first device; identifying any second device actions occurring within the field of view of the first device based on the new position and orientation of the first device and the user input information of the second device; displaying on a display of the first device the identified first device actions occurring within the field of view of the first device and the identified second device actions occurring within the field of view of the first device; calculating in the first device a predicted position and orientation of the first device in the real world coordinate system; calculating as a sensor error of the first device a difference between the predicted position and orientation of the first device and the new position and orientation of the first device; receiving at the first device from the second device a communicated sensor error of the second device; directing the user of the first device to perform a second game convention if either the sensor error of the first device or the sensor error of the second device exceeds a predefined limit.

BRIEF DESCRIPTION OF DRAWINGS

FIGS. 8a and 8b are flowcharts depicting the actions and communications of the first device during game play and reducing sensor error for the augmented reality game according to one embodiment.

DETAILED DESCRIPTION OF THE INVENTION

In various embodiments are provided methods and systems for establishing a virtual world in an interactive augmented reality game environment using one or more game conventions and reducing sensor based error during interactive augmented reality game play through use of one or more game conventions as will be described.

These methods and systems are used for interactive augmented reality game play on mobile devices of two or more players. In one embodiment, two players are located in a room each using a mobile device that is running the augmented reality game. One objective of the game is for the players to shoot at targets generated and displayed on the mobile devices by the augmented reality game superimposed on a video feed of the surrounding room. In such interactive game play, when one player turns towards the other player, the one player sees the other player displayed on their mobile device via the video feed. Further, when the other player shoots at a game generated target visible on the one player's mobile device this too is displayed on their mobile device. In this way, as game generated targets, such as aliens or zombies, swami around the players in their displayed views of the room, each player can fire at the same target is) and see the results on their respective mobile device displays.

The mobile devices used to run the interactive augmented reality game include various sensors used by the game. Such sensors can include a Global Positioning System (GPS) sensor which uses radio signals from satellites to determine the mobile device's absolute location in longitude and latitude. Such sensors can include a compass which detects the earth's magnetic field to determine the mobile device's absolute position in degrees north. Such sensors can include one or more accelerometers to determine physical movement of the mobile device. Such sensors can include a gyroscope for measuring or maintaining orientation of the mobile device based on principles of conservation of angular momentum. The use and operation of these various sensors is known in the art.

Figure 1:
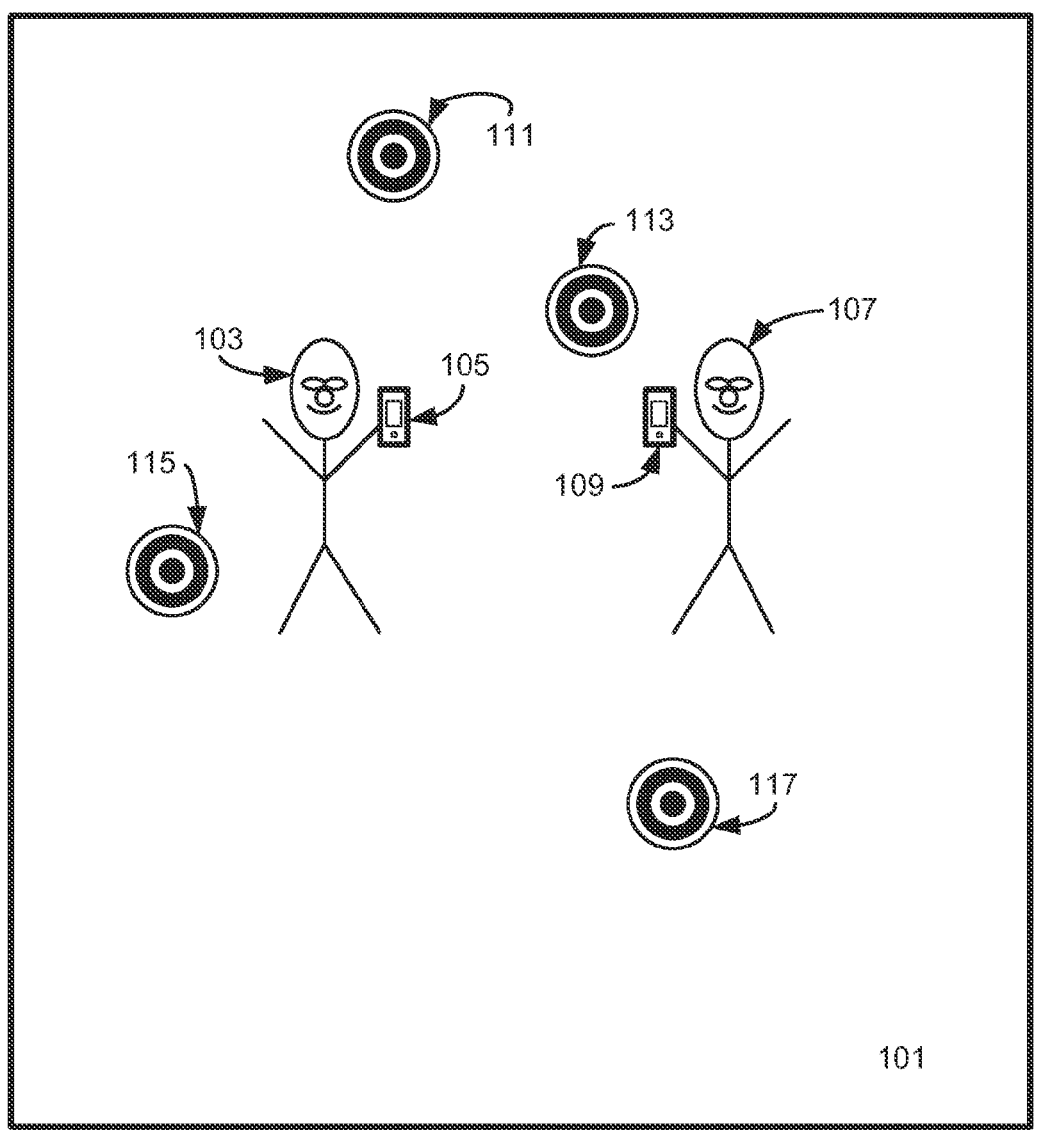
FIG. 1 depicts two players in a physical room participating in an interactive multiplayer augmented reality game.

Referring now to FIG. 1, a physical room 101 is shown as abounding box in the figure. In this example, room 101 contains two game players, game player 103 and game player 107. It is to be understood that the term "player" Or "game player" as used herein refers to a user of a device running a game rather than referring to the device itself. Game player 103 is shown holding a mobile device 105 in the figure white game player 107 is shown holding a mobile device 109.

Also shown are various targets 111, 113, 115 and 117 generated by an interactive multiplayer augmented reality game separately running on mobile device 103 and mobile device 109. Despite showing targets 111, 113, 115 and 117 in the figure, it is to be understood that they do not exist in the physical real-world and, as such, they are not visible to someone merely viewing room 101.

Each of game player 103 and game player 107 is a player of the same, albeit separate copy of, interactive augmented reality game by virtue of their respective use of mobile device 105 and mobile device 109. Further, each player experiences the augmented reality through a display on their respective game device which displays a video image of whatever portion of the physical room 101 is captured by a video camera (not shown) of the game device upon which display is superimposed whatever game generated elements, such as targets 111, 113, 115 and 117, are determined by the game to be within that portion of room 101.

Figure 2:
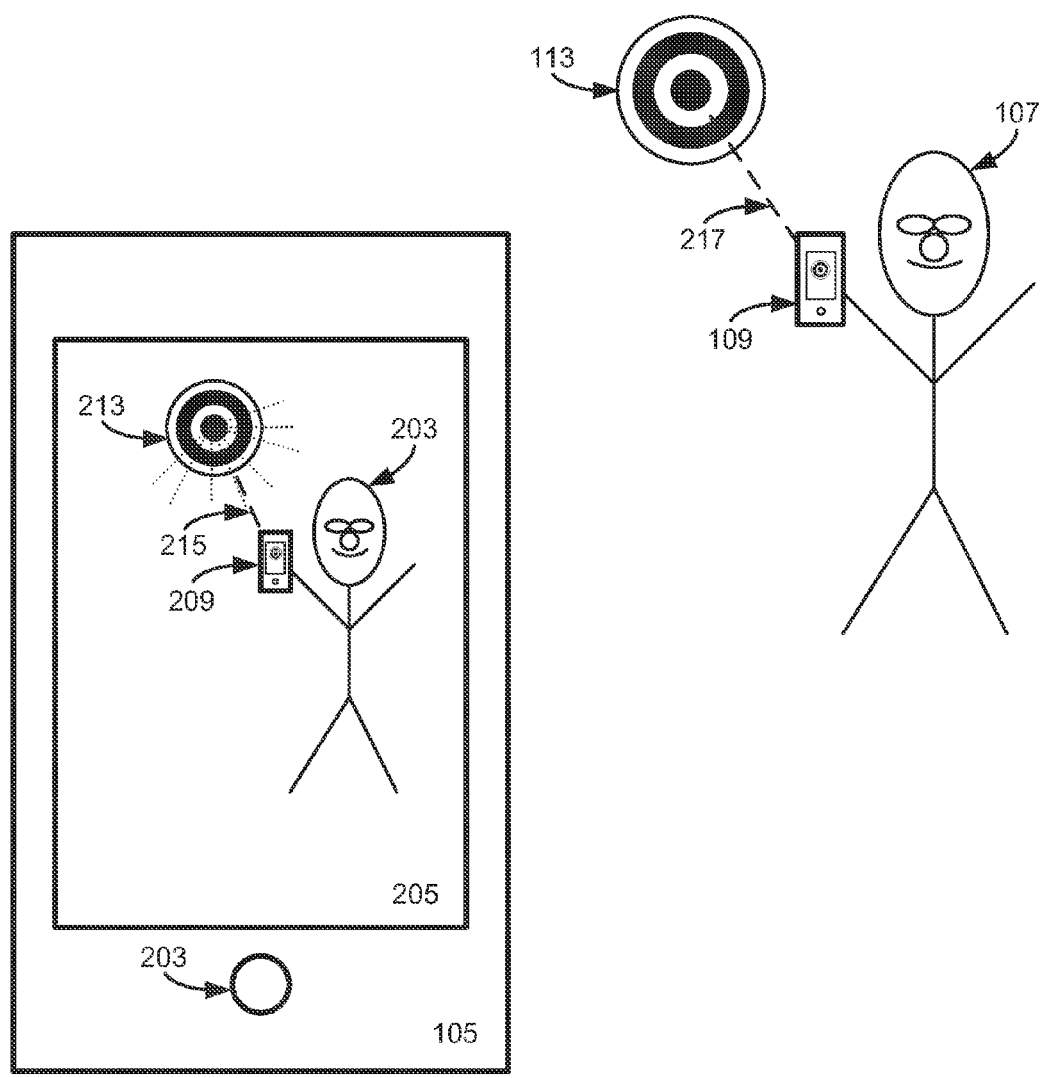
FIG. 2 depicts a close-up of the first player's game device looking towards the second player and second player's game device while playing the interactive multiplayer augmented reality game in the physical room of FIG. 1.

For example, referring now to FIG. 2, mobile device 105 of player 103 is shown in close-up as well as player 107 and mobile device 109 of player 107. Also shown is One of the augmented reality game generated targets 113 (which, again, would not be visible to the naked eye and would, instead, only be visible through the augmented reality game).

As shown in the figure, mobile device 105 has a display 205. When mobile device 105 is running the augmented reality game, display 205 shows the video image of a portion of the physical room as provided by mobile device 105's video camera (not shown) as well as any superimposed game generated elements such as targets, etc., located in that portion of the room. In this example, because of the direction mobile device 105 is presently being pointed by player 103, the video image includes a view of player 107 and player 107's mobile device 109 on display 205 of mobile device 105 which are depicted in the figure on display 205 as displayed game player 207 and displayed mobile device 209. Further, the augmented reality game running on mobile device 105 has determined that game generated target 113 is located within the field of view of the video camera of mobile device 105 which is providing the video image of the portion of room 101 containing player 107 and mobile device 109 and therefore the game displays generated target 113 as displayed target 213 on display 205 of mobile device 105. Information presented to the user is thus displayed in a camera view coordinate system constructed within each device using each device's position, orientation, and field of view in their respective virtual world coordinate system.

It is again to be noted that target 113 does not exist in the physical real world and would therefore not be visible to anyone not participating in the augmented reality game. Target 113 is therefore shown on display 205 as displayed target 213, not because it was captured by a video camera of mobile device 105 but, instead, is simply the augmented reality game generated target superimposed on the displayed video image shown on display 205.

Referring again to FIG. 1, in one embodiment game player 103 wishes to play the interactive multiplayer augmented reality game with game player 107, each of whom is located in room 101, by running a copy of the game on mobile device 105. Likewise, game player 107 also wishes to play the interactive multiplayer augmented reality game with game player 103 by running another copy of the game on mobile device 109. In this embodiment, while the game running on mobile device 107 can communicate with the game running on mobile device 109 and vice-versa, as explained further herein, neither is dependent upon any server or supervisory game software or game system to inform them of overall game environment, conditions and/or input of the various players interacting in the game. As such, each copy of the game running on each of the respective mobile devices operates independently as is explained further herein. Before interactive multiplayer augmented reality game plan can begin, however, a virtual world coordinate system for the game environment is first created, as will be explained.

Figure 3:
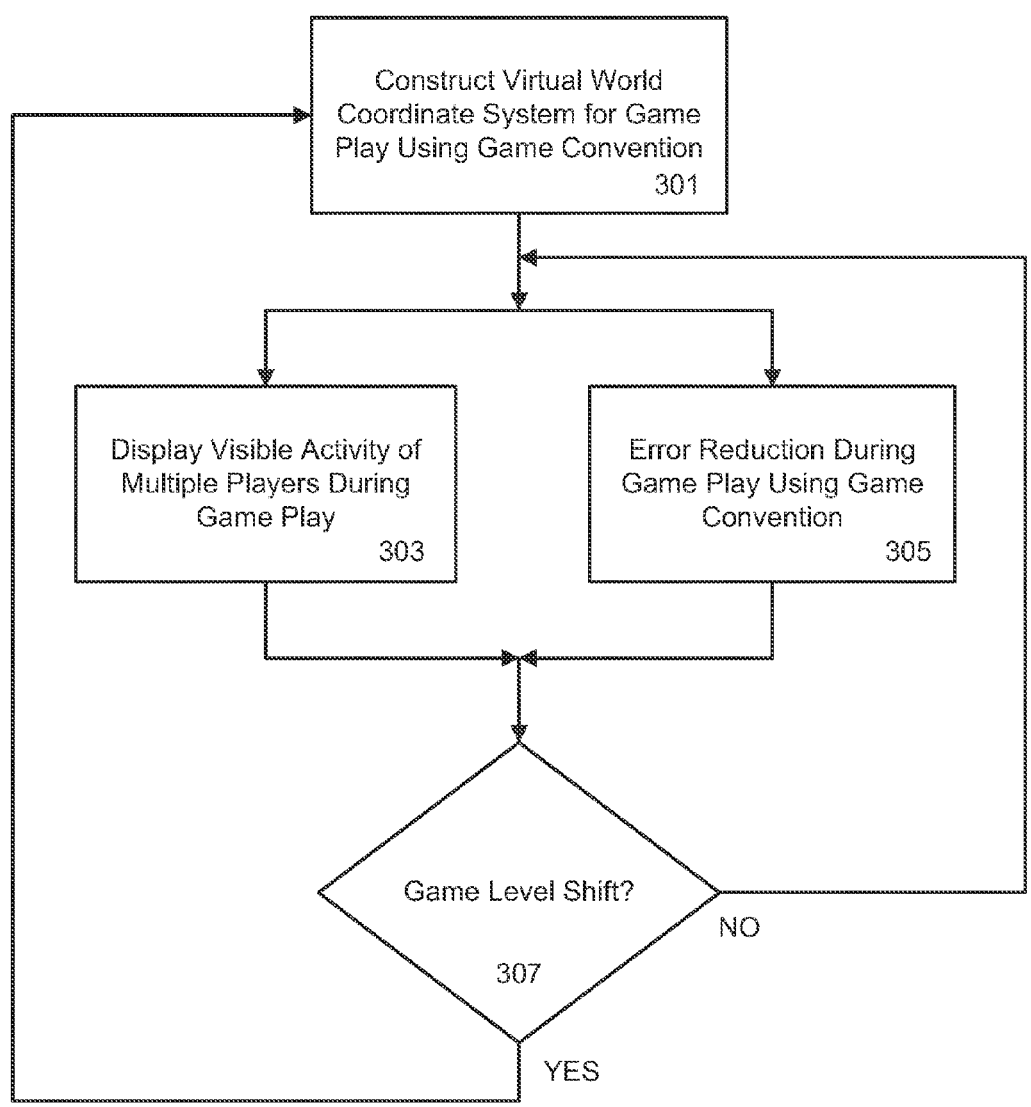
FIG. 3 is a process flow diagram of the overall process according to one embodiment.

Referring now to FIG. 3, a flowchart diagram depicting an overall process flow according to one embodiment can be seen. According to this embodiment, in step 301 a virtual world coordinate system is constructed for game play by using a game convention. It is to be understood that the term "game convention" as used herein refers to any commonly known technique or method used in a game to direct, involve or provide some information to a game player.

In one example, the game convention used is a face off game convention. A face off game convention is one where the game directs the interactive game player to stand face to face with another interactive game player while standing a set distance away from the other, game player, for example, one meter apart, in one embodiment, the game uses sensor information obtained during the face off game convention to formulate the virtual world coordinate system as will be explained.

In a further example, the game convention used is a countdown game convention. A countdown game convention is one which prompts the user to remain stationary for some period of time while the game displays, for example, a numbered countdown, a time piece's moving hand(s) or a scrolling or static portion of text to be read by the user.

Optionally, step 301 also establishes a baseline operating point for sensors of a player's mobile device by eliminating interference as wilt also be explained elsewhere herein.

Having now constructed the virtual world for game play, the game can be played in step 303 by displaying on the display of the player's mobile device any gaming actions occurring in the device display's current field of view.

Also occurring before, during and/or after such game play action is a process of reducing sensor errors of the mobile device in step 305, as will be explained, to allow the continued game play of step 303.

Lastly, when the game reaches a point of changing from one game level to the next game level (also sometimes referred to as a change from one game chapter, scene or round to the next game chapter, scene or round), as determined by decision block 307, the process of constructing the virtual world coordinate system in step 301 is repeated thus re-establishing the game virtual world coordinate system. Otherwise, game play 303 and error reduction 305 continue as indicated in the figure.

These steps will now be explained in greater detail with reference to FIGS. 4-6 according to one embodiment.

Figure 4:
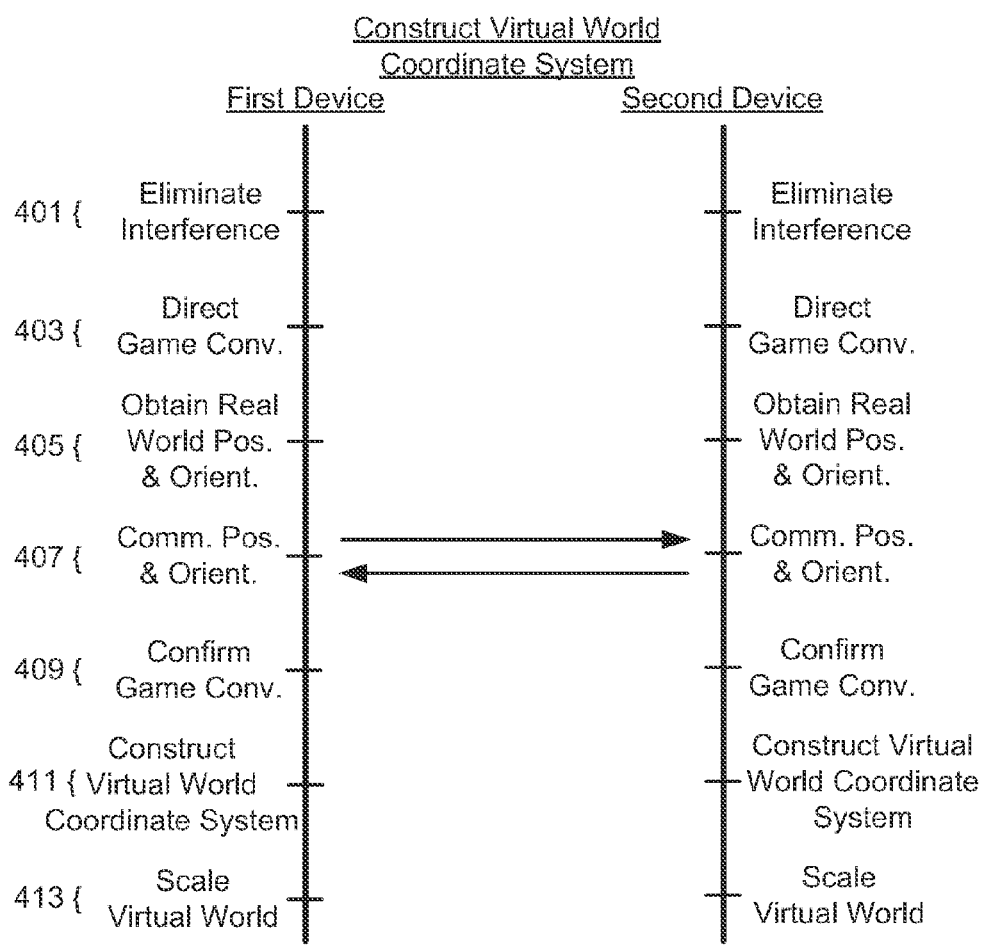
FIG. 4 is chart depicting the actions and communications of each of the two devices constructing a virtual world coordinate system of the augmented reality game according to one embodiment.

Referring now to FIG. 4, a chart is shown depicting the actions taken and communications occurring within and between two devices performing the operations of one embodiment of step 301 of FIG. 3, that is, constructing a virtual world coordinate system for interactive augmented reality game play using a face off game convention, according to one embodiment.

A first device's actions and communications are shown on the left-hand side of the figure while a second device's actions and communications are shown on the right-hand side of the figure. An exemplary first device is mobile device 105 of game player 103 of FIGS. 1-2 and an exemplary second device is mobile device 109 of game player 107 of FIGS. 1-2.

The first step taken, optional in this embodiment, is to eliminate interference 401 within each of the first device and the second device. The interference being eliminated in step 401 is that of the sensors within each of the respective devices.

In one example, if the compass appears to be giving erroneous readings (e.g., the orientation information provided by the compass is varying too greatly), the user of the device (e.g., game player 103 using mobile device 105 of FIG. 1) can be directed to perform a "figure 8" game convention to recalibrate the compass within the device so that it can return to providing correct readings. A figure 8 game convention is a known sensor recalibration technique in which the user is directed to hold the device level and physically move it in a figure 8 motion as if it was being driven on a small race track shaped like the figure 8. A figure 8 game convention is sometimes referred to as a barrel roll and while not technically the same physical motion is considered the same herein because it achieves essentially the same compass recalibration result as does a figure 8 game convention.

In another example, if the GPS provided location information appears to be giving erroneous readings (e.g., the position information provided by the GPS is varying too greatly), the game may prompt a countdown game convention to provide the GPS sensor time to zero in on an absolute position as its samples are averaged over time.

In step 403, the game running on the first device directs the user of the first device to perform a game convention. Likewise, the game running on the second device directs the user of the second device to perform a game convention. In one embodiment, the game running on each device directs the user to perform a face off game convention. In another embodiment, the game running on each device directs the user to also perform a countdown game convention.

For example, the game running on mobile device 105 directs game player 103 to perform a face off game convention with game player 107 and the game running on mobile device 109 directs game player 107 to perform a face off game convention with game player 103, as depicted in FIG. 1. In a further example, the game running on mobile device 105 also directs game player 103 to perform a countdown game convention and the game running on mobile device 109 also directs game player 107 to perform a countdown game convention.

Presuming the respective device users have complied with the game directions, in this example performing a face off game convention, in step 405, the game running on the first device obtains the position and orientation of the first device in a real world coordinate system from the sensors of the first device and the game running on the second device obtains the position and orientation of the second device in the real world coordinate system from the sensors of the second device. For example, the game running on mobile device 105 obtains the position (in longitude and latitude) and orientation (in degrees North) of mobile device 105 from the GPS and compass sensors of bile device 105 and the game running on mobile device 109 obtains the position (in longitude and latitude) and orientation (in degrees North) of mobile device 109 from the GPS and compass sensors of mobile device 109. It is to be noted that, despite possibly having Obtained a position and orientation of a device a some earlier point in time, for purposes of explanation the obtained position and orientation of each device in step 405 is referred to herein as an initial position and orientation.

In step 407, the game running on the first device directs the first device to communicate the first device's initial position and orientation to the second device and the game running on the second device directs the second device to communicate the second device's initial position and orientation to the first device. For example, the game running on mobile device 105 directs mobile device 105 to communicate the initial position and orientation of mobile device 105 to mobile device 109 and the game running on mobile device 109 directs mobile device 109 to communicate the initial position and orientation of mobile device 109 to mobile device 105.

In step 409, the game running on the first device confirms that a face off game convention has been performed by the user of the first device by comparing the initial position and orientation of the first device obtained in step 405 with the initial position and orientation of the second device received in step 407. In particular, if the initial orientation of the first device is 180 degrees opposite and directed towards the initial orientation of the second device then the two devices are determined to be facing each other and if the first device initial position relative to the second device initial position indicates that they are the specified distance apart then the combination of these two determinations confirms that the user of the first device has properly performed the face off game convention.

For example, the game running on mobile device 105 compares the initial orientation of mobile device 105 obtained in step 405 to the initial orientation of mobile device 109 received in step 407 to determine that they are 180 degrees apart and facing each other and compares the initial position of mobile device 105 obtained in step 405 to the initial position of mobile device 109 received in step 407 to determine that mobile device 105 is located the specified distance from mobile device 109 then this confirms that game player 103 using mobile device 105 has properly performed the face off game convention.

Also in step 409, the game running on the second device confirms that a face off game convention has been performed by the user of the second device by comparing the initial position and orientation of the second device obtained in step 405 with the initial position and orientation of the first device received in step 407. In particular, if the initial orientation of the second device is 180 degrees opposite and directed towards the initial orientation of the first device then the two devices are determined to be facing each other and if the second device initial position relative to the first device initial position indicates that they are the specified distance apart then the combination of these two determinations confirms that the user of the second device has property performed the face off game convention.

For example, the game running on mobile device 109 compares the initial orientation of mobile device 109 obtained in step 405 to the initial orientation of mobile device 105 received in step 407 to determine that they are 180 degrees apart and facing each other and compares the initial position of mobile device 109 obtained in step 405 to the initial position of mobile device 105 received in step 407 to determine that mobile device 109 is located the specified distance from mobile device 105 then this confirms that game player 107 using mobile device 109 has properly performed the face off game convention.

In step 411, the game running on the first device constructs a virtual world coordinate system for game play on the first device based on the initial position of the first device in the real world coordinate system and the initial position of the second device in the real world coordinate system. Also in this step the game running on the second device constructs a virtual world coordinate system for game play on the second device based on the initial position of the second device in the real world coordinate and the initial position of the first device in the real world coordinate system. In particular, in one embodiment a virtual world coordinate system is constructed within each device with its origin at a bisected line between the first device's initial position and the second device's initial position. It is to be noted that by following the approach described herein the origin of the virtual world coordinate system constructed by the game running on the first device is the same as the origin of the virtual world coordinate system constructed by the game running on the second device thus essentially coordinating or correlating each respective devices' view of the world.

For example, the game running on mobile device 105 constructs a virtual world coordinate system for game play on mobile device 105 where the virtual world coordinate system has its origin at a bisected line between mobile device 105 and mobile device 109 and the game running on mobile device 109 constructs a virtual world coordinate system for game play on mobile device 109 where the virtual world coordinate system has its origin at a bisected line between mobile device 109 and mobile device 105. As such, in this example, the origin of the virtual world coordinate system constructed in each of mobile device 105 and mobile device 109 is located at the one-half meter mark along the one meter distance between mobile device 105 of game player 103 and mobile device 109 of game player 107 as they perform the face off game convention.

In optional step 413, the game running on the first device scales the virtual world coordinate system constructed for game play on the first device and the game running on the second device scales the virtual world coordinate system constructed for game play on the second device. In particular, in one embodiment the virtual world coordinate system constructed in each device is scaled based on a captured image taken by each respective game device while the users perform the face off game convention. The difference between a calculated depth of the background (e.g., a wall behind the other player/device) and a calculated depth of the foreground (e.g., the other player) can be used to determine the bounds of play. This information can then be used to establish that each one unit of space in the game's virtual world coordinate system corresponds to one meter in the real world, for example. This step is optional, however, because assumptions can be made about the scale of play instead.

Once the virtual world coordinate system has been constructed in the respective devices, interactive multiplayer augmented reality game play can begin.

Figure 5:
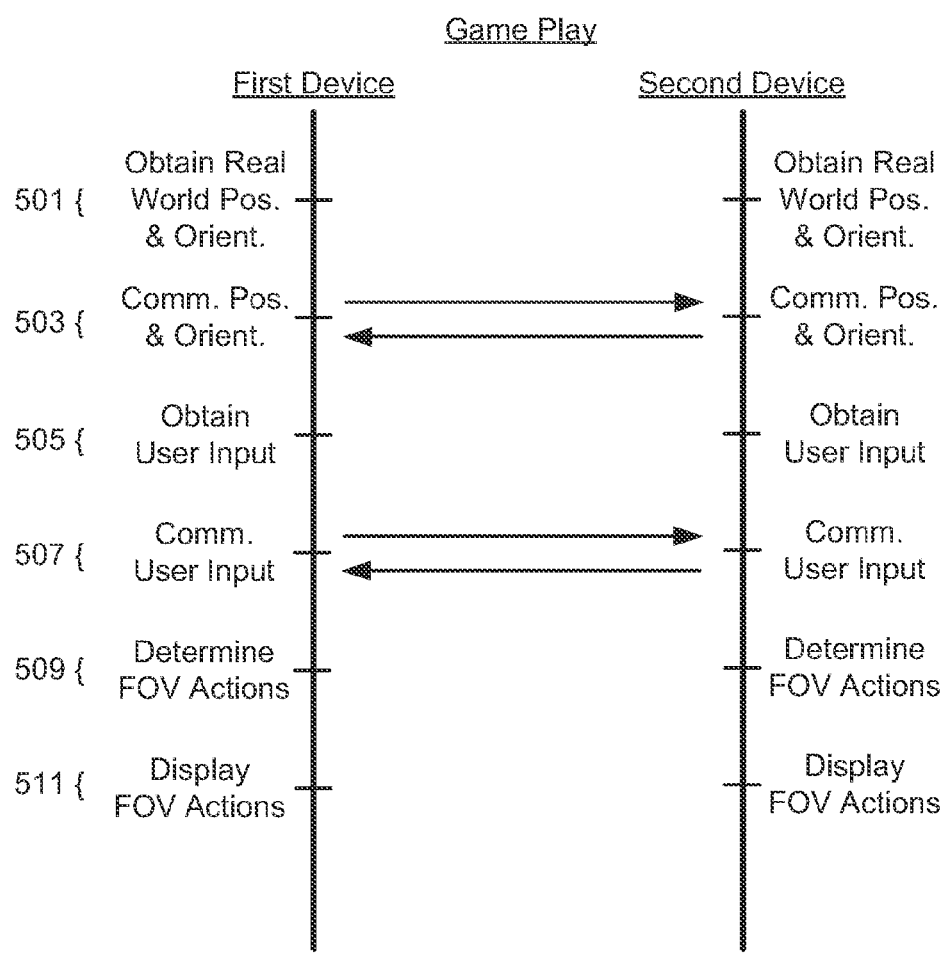
FIG. 5 is chart depicting the actions and communications of each of the two devices during game play of the augmented reality game according to one embodiment.

Referring now to FIG. 5, a chart is shown depicting the actions taken and communications occurring within and between two devices performing the operations of one embodiment of step 303 of FIG. 3, that is, displaying visible activity of multiple players during interactive augmented reality game play, according to one embodiment.

As with FIG. 4, the first device's actions and communications are shown on the left-hand side of the figure while the second device's actions and communications are shown on the right-hand side of the figure. An exemplary first device is mobile device 105 of game player 103 of FIGS. 1-2 and an exemplary second device is mobile device 109 of game player 107 of FIGS. 1-2.

In step 501, the game running on the first device obtains anew position and orientation of the first device in the real world coordinate system from the sensors of the first device and the game running on the second device obtains a new position and orientation of the second device in the real world coordinate system from the sensors of the second device. The difference between the new position and orientation of the first device obtained in step 501 and the initial position and orientation of the first device obtained in step 405 of FIG. 4 is simply caused by whatever movement of the first device has occurred between the time each is obtained. Likewise, the difference between the new position and orientation of the second device obtained in step 501 and the initial position and orientation of the second device obtained in step 405 of FIG. 4 is simply caused by whatever movement of the second device has occurred between the time each is obtained.

For example, the game running on mobile device 105 obtains a new position and orientation of mobile device 105 from the GPS and compass sensors of mobile device 105 and the game running on mobile device 109 obtains a new position and orientation of mobile device 109 from the GPS and compass sensors of mobile device 109.

In step 503, the game running on the first device directs the first device to communicate the first device's new position and orientation to the second device and the game running on the second device directs the second device to communicate the second device's new position and orientation to the first device. For example, the game running on mobile device 105 directs mobile device 105 to communicate the new position and orientation of mobile device 105 to mobile device 109 and the game running on mobile device 109 directs mobile device 109 to communicate the new position and orientation of mobile device 109 to mobile device 105.

In step 505, the game running on the first device obtains input from the user of the first device and the game running on the second device obtains input from the user of the second device. In one embodiment, such input can include a user tapping on a location on the device display to indicate the user's desire to fire a game weapon in a direction corresponding to that display location. In another embodiment, such input can include a user pressing on a button on the device to trigger shooting a weapon in the game running on the device. It is to be understood that such button can be a physical button of the device or can be a soft button on the display as generated by the game running on the device. Such user input information can thus be obtained via one or more physical interface elements such as buttons, sliders, switches, etc., or via a game generated set of interface elements (commonly referred to as a Graphical User Interface (GUI)) or a combination of both.

For example, the game running on mobile device 105 obtains input from game player 103's interaction with mobile device 105 and the game running on mobile device 109 obtains input from game player 107's interaction with mobile device 109.

In step 507, the game running on the first device directs the first device to communicate the first device's user input information to the second device and the game running on the second device directs the second device to communicate the second device's user input information to the first device. For example, the game running on mobile device 105 directs mobile device 105 to communicate game player 103's interaction with the GUI of mobile device 105 to mobile device 109 and the game running on mobile device 109 directs mobile device 109 to communicate game player 107's interaction with the GUI of mobile device 109 to mobile device 105.

In step 509, the game running on the first device determines what actions specified by the first device user input, obtained in step 505, and what actions specified by the second device user input, received in step 507, are to occur within the field of view of the display of the first device. Also in step 509, the game running on the second device determines what actions specified by the second device user input, obtained in step 505, and what actions specified by the first device user input, received in step 507, are to occur within the field of view of the display of the second device. Such action can include, for example, a displayed target generated by the augmented reality game being hit by weapon fire as specified by either one of the users tapping on their respective device display in the direction of or at the displayed location of the game generated target.

For example, the game running on mobile device 105 determines what actions specified by mobile device 105's GUI input obtained in step 505 and what actions specified by mobile device 109's GUI input received in step 507 are to occur within the field of view of the display of mobile device 105. Likewise, the game running on mobile device 109 determines what actions specified by mobile device 109's GUI input obtained in step 505 and what actions specified by mobile device 105's GUI input received in step 507 are to occur within the field of view of the display of mobile device 109.

In step 511, the game running on the first device displays on a display of the first device those actions determined in step 509 to be within the field of view of the display of the first device and the game running on the second device displays on a display of the second device those actions determined in step 509 to be within the field of view of the display of the second device.

For example, the game running on mobile device 105 displays on the display of mobile device 105 those actions determined in step 509 to be within a field of view of the display of mobile device 105 and the game running on mobile device 109 displays on the display of mobile device 109 those actions determined in step 509 to be within a field of view of the display of mobile device 109.

In further example, referring again to FIG. 2, the game running on mobile device 105 is shown displaying on display screen 205 of mobile device 105 (via step 511) the determined action of weapon fire 215 directed towards game generated target 213 (via step 509) which is based on mobile device 109's input received from game player 107 directed towards augmented reality game generated target 113 (via step 505) which input from player 107 was communicated from mobile device 109 to mobile device 105 (via step 507).

Of course, as is known, the sensors in these devices accumulate error over time. As such, the information provided by these sensors becomes increasingly inaccurate during game play. This can be addressed by error reduction techniques as will now be described.

Figure 6:
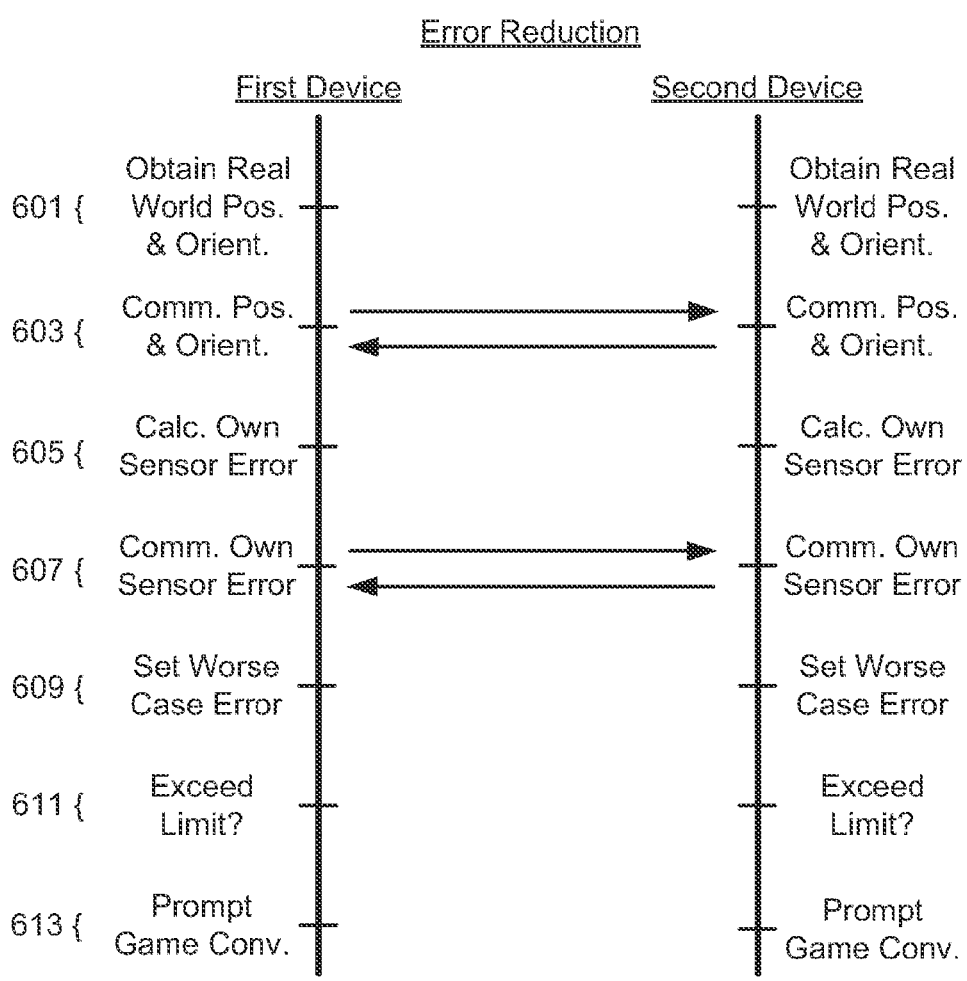
FIG. 6 is a chart depicting the actions and communications of each of the two devices reducing sensor error for the augmented reality game according to one embodiment.

Referring now to FIG. 6, a chart is shown depicting the actions taken and communications occurring within and between two devices performing the operations of one embodiment of step 305 of FIG. 3, that is, reducing error during game play using a game convention, according to one embodiment.

As with FIGS. 4 and 5, the first device's actions and communications are shown on the left-hand side of the figure while the second device's actions and communications are shown on the right-hand side of the figure. An exemplary first device is mobile device 105 of game player 103 of FIGS. 1-2 and an exemplary second device is mobile device 109 of game player 107 of FIGS. 1-2.

In step 601, the game running on the first device obtains the new position and orientation of the first device in the real world coordinate system from the sensors of the first device and the game running on the second device obtains the new position and orientation of the second device in the real world coordinate system from the sensors of the second device. For example, the game running on mobile device 105 obtains the new position and orientation of mobile 105 from the sensors of mobile device 105 and the game running on mobile device 109 obtains the new position and orientation of mobile device 109 from the sensors of mobile device 109.

In step 603, the game running on the first device directs the first device to communicate the first device's new position and orientation to the second device and the game running on the second device directs the second device to communicate the second device's new position and orientation to the first device. For example, the game running on mobile device 105 directs mobile device 105 to communicate the new position and orientation of mobile device 105 to mobile device 109 and the game running on mobile device 109 directs mobile device 109 to communicate the new position and orientation of mobile device 109 to mobile device 105.

In step 605, the game running on the first device calculates the sensor error of the first device and the game running on the second device calculates the sensor error of the second device. In one embodiment, each device calculates its own sensor error by first determining its predicted position and orientation based on previously saved new (now past) positions and orientations using any known technique such as extrapolation and then comparing that predicted position and orientation to the new position and orientation Obtained in step 601 to yield a difference which is then deemed to be the sensor error of the device. In another embodiment, each device calculates the sensor error of each other device rather than rely on another device to do it.

For example, the game running on mobile device 105 calculates the sensor error of mobile device 105 by calculating the predicted position and orientation of mobile device 105 by extrapolation based on previously saved new (now past) positions and orientations of mobile device 105 and then comparing the predicted position and orientation of mobile device 105 to the new position and orientation of mobile device 105 obtained in step 601 to yield a difference which is then deemed by the game as being the sensor error of mobile device 105. Likewise, the game running on mobile device 109 calculates the sensor error of mobile device 109 by calculating the predicted position and orientation of mobile device 109 by extrapolation based on previously saved new (now past) positions and orientations of mobile device 109 and then comparing the predicted position and orientation of mobile device 109 to the new position and orientation of mobile device 109 obtained in step 601 to yield a difference which is then deemed by the game as being the sensor error of mobile device 109.

Various approaches are known in the art for predicting a position and orientation of a device based on a set of previously saved new (now past) positions and orientations any of which can be used with the approach described herein. Additionally, two different approaches will now be described either of which can be used.

In the first predicted position and orientation approach, each of a number of previously saved new (now past) positions and orientations is expanded from a point to a disk having a radius of the sensor error value corresponding to each respective previously saved new (now past) position and orientation. With two or more saved positions and orientations, it is possible to construct a moving average so as to predict the position and orientation of the next disk.

In the second predicted position and orientation approach, each of a number of previously saved new (now past) new positions and orientations is expanded from a point to a disk or segment having a radius of the sensor error value corresponding to each respective past position and orientation.

Each of these is thus a contiguous set of segments in space forming a curvilinear tube. The moving average of the centers of mass of these multiple segments is then extrapolated to obtain a center of mass of a next, predicted segment. This center amass of the next, predicted segment is then used as the predicted position and orientation.

In step 607, the game running on the first device directs the first device to communicate the first device's sensor error to the second device and the game running on the second device directs the second device to communicate the second device's sensor error to the first device. For example, the game running on mobile device 105 directs mobile device 105 to communicate the sensor error of mobile device 105 to mobile device 109 and the game running on mobile device 109 directs mobile device 109 to communicate the sensor error of mobile device 109 to mobile device 105.

In step 609, the game running on each device sets as a worse case error whichever is greater of the sensor error of the device on which the game is running, as calculated in step 605, or the sensor error of the other device participating in the interactive game, as received in step 607. For example, the game running on mobile device 105 sets as a worse case sensor error whichever is greater of the sensor error of mobile device 105, as calculated in step 605, or the sensor error of mobile device 109, as received in step 607 and, likewise, the game running on mobile device 109 sets as a worse case sensor error whichever is greater of the sensor error of mobile device 109, as calculated in step 605, or the sensor error of mobile device 105, as received in step 607.

In step 611, the game running on each device determines whether the worse case error set in step 609 has exceeded a predefined limit set in the game running on the respective device. For example, the game running on mobile device 105 determines whether the worse case error of mobile device 105, as set in step 609, has exceeded a predefined limit set in the game running on mobile device 105 and, likewise, the game running on mobile device 109 determines whether the worse case error of mobile device 109, as set in step 609, has exceeded a predefined limit set in the game running on mobile device 109. It is to be understood that meeting a predefined limit is considered the same as exceeding a predefined limit in that such determination is simply directed to the question of whether the worse case sensor error has yet reached a point where continued game play is problematic without going back and reconstructing the virtual world coordinate system within a mobile device.

In one embodiment, the predefined is based on a known average error of one or more sensors. For example, if the GPS sensor is known to have an average error of +/−40 meters, then the predefined limit can be set to that known average error. Similarly, if the compass sensor is known to have an average error of +/−30 degrees, then the predefined limit can be set to that known average error. In a still further example, the predefined limit can be a combination of sensor errors, each of which is set the same as a predefined limit of a single sensor error or each of which is set differently than a predefined limit of a single sensor error to thereby account for the combined sensor error.

In step 613, if it was determined in step 611 by the game running on a device that the worse case error has exceeded a predefined limit of the device then the game running on that device prompts a game convention to reset or recalibrate that device's sensor thereby reducing the error.

It is to be understood that various game conventions can be prompted by the game, either singly or in combination, as needed to reset or recalibrate one or more sensors of the device. Examples of such game conventions which may be prompted in various embodiments will now be described.

In the case of a compass sensor being the cause of the error, a game convention such as a figure 8 can be prompted by the game. Having a user perform a figure 8 with the mobile device provides the compass sensor with the information needed for it to recalibrate itself.

Alternatively, in the case of a compass sensor error, a game convention of a spawn point can be prompted by the game. As is known the art, a spawn point is a location in the augmented reality game where an item such as a target is generated and displayed. Generating and displaying a target on a display of the device typically causes the user to turn towards and/or shoot at the spawn point thus causing the compass sensor to be reset or be recalibrated based on the games knowledge of the location of the spawn point and therefore the direction the player and device will be facing when the player's attention is directed towards the spawn point.

In the case of a GPS sensor being the cause of the error, a game convention of introducing a game boss to gamer user's attention and thereby slow down play cat be prompted by the game. Slowing down the player's movement of the device can provide the GPS sensor with the opportunity to average a number of samples white the device is relatively stationary thereby recalibrating the GPS sensor.

For example, if it was determined in step 611 that the worse case error of mobile device 105 exceeded a predefined limit set in the game running on mobile device 105 then the game running on mobile device 105 prompts game player 103 to perform a game convention such as introducing a game boss to get game player 103's attention. Likewise, if it was determined in step 611 that the worse case error of mobile device 109 exceeded a predefined limit set in the game running on mobile device 109 then the game running on mobile device 109 prompts game player 107 to perform a game convention otherwise the game running on mobile device 109 merely continues play uninterrupted.

Having thus caused a reset or recalibration of a device's sensor thereby reduces error caused by the sensor which provides the benefit of allowing continued game play, as described with respect to step 303 of FIG. 3 and the corresponding steps of FIG. 5 without having to reestablish or reconstruct the virtual world coordinate system. In other words, interactive multiplayer augmented reality game play can continue because of the reduced sensor error.

Then, as was described with reference to FIG. 3, when the game reaches a point of changing from one level to the next level, as determined in decision block 307, the virtual world coordinate system can again be constructed in step 301 to re-establish the baseline game virtual world coordinate system for continued play as described.

Figure 7:
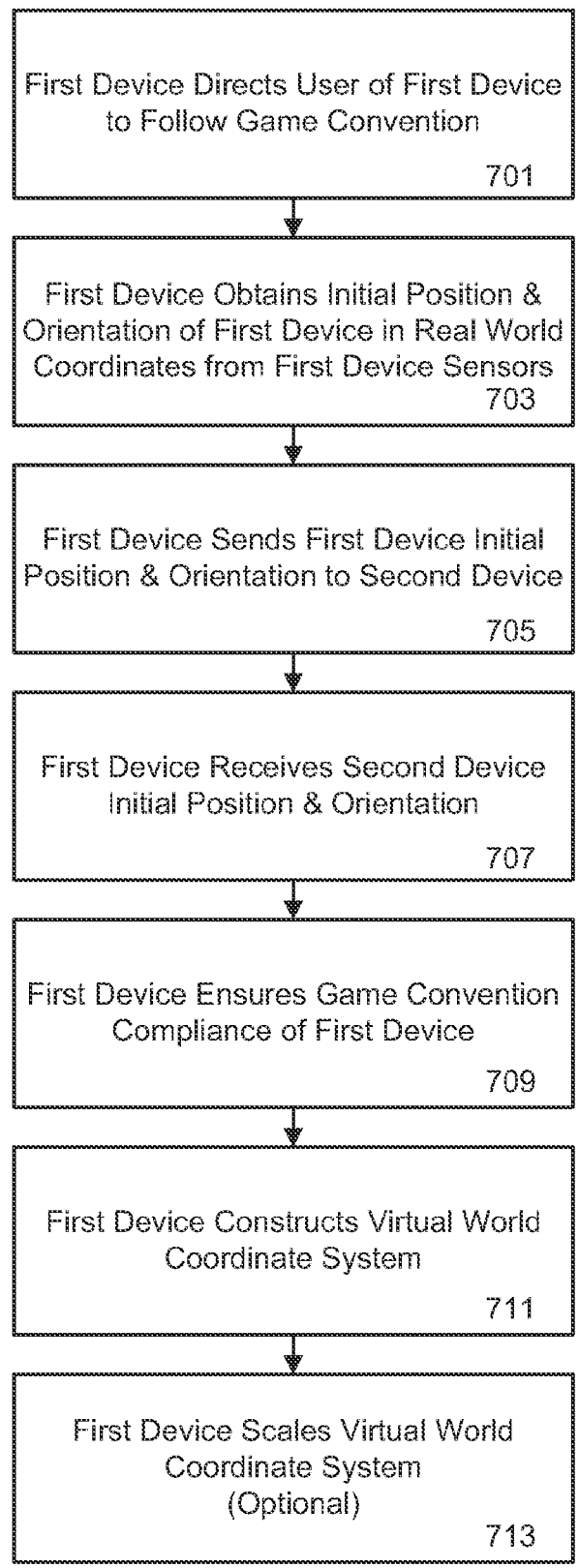
FIG. 7 is a flowchart depicting the actions and communications of the first device constructing a virtual world coordinate system of the augmented reality game according to one embodiment.
Figure 8B:
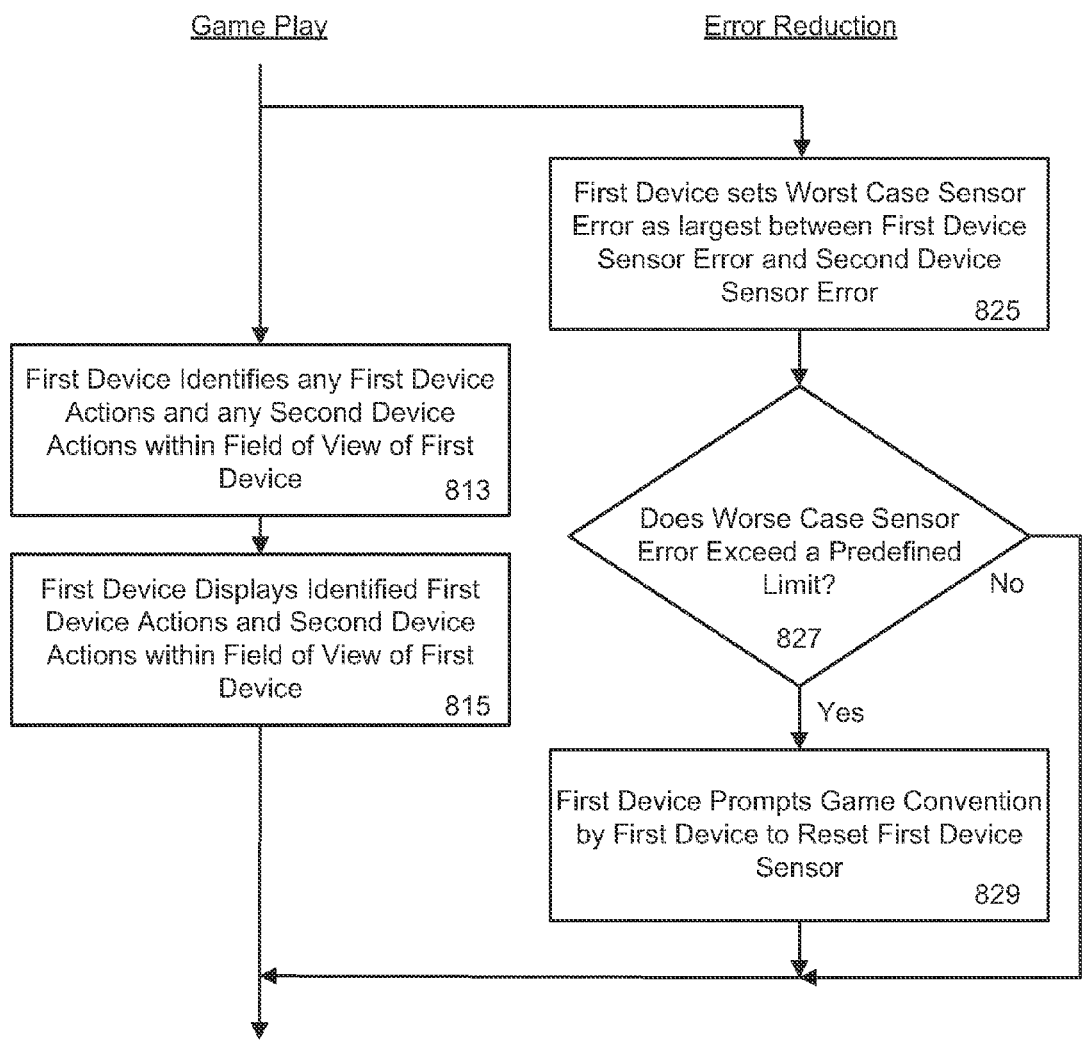

Referring now to FIGS. 7, 8a and 8b, the processes described with reference to steps 301, 303 and 305 of FIG. 3, which were elaborated on with reference to FIGS. 4-6, will now be explained from the perspective of the first device.

It should be noted that the steps shown in FIGS. 8a and 8b are generally separated into a first column comprising steps 801, 803, 805, 807, 809, 811, 813 and 815 directed to the game play (corresponding to step 303 of FIG. 3) and a second column comprising steps 801, 817, 819, 821, 823, 825, 827 and 829 directed to the error reduction (corresponding to step 305 of FIG. 3). Of course, as will be explained, some of the steps shown and described can be considered a part of both the game play process and the error reduction process and, further, some of the steps which are the same between the two processes may be combined for use by both.

Referring first to FIG. 7, in step 701 the game running on the first device directs the user of the first device to perform a face off game convention with another player. For example, the game running on mobile device 105 directs game player 103 to perform a face off game convention with game player 107 as depicted in FIG. 1.

In step 703, the game running on the first device obtains the initial position and orientation of the first device in a real world coordinate system from the sensors of the first device. For example, the game running on mobile device 105 obtains the initial position and orientation of mobile device 105 from the sensors of mobile device 105.

In step 705, the game running on the first device directs the first device to communicate the first device's initial position and orientation to the second device. It is to be understood that this step is optional from the perspective of the first device although it is, of course, important to the second device's play. For example, the game running on mobile device 105 directs mobile device 105 to communicate the initial position and orientation of mobile device 105 to mobile device 109.

In step 707, the game running on the first device receives from the second device the second device's initial position and orientation in the real world coordinate system. For example, the game running on mobile device 105 receives from mobile device 109 the initial position and orientation of mobile device 109.

In step 709, the game running on the first device ensures that the game convention has been performed by the user of the first device by comparing the initial position and orientation of the first device obtained in step 705 with the initial position and orientation of the second device received in step 707. In particular, if the initial orientation of the first device is 180 degrees opposite and directed towards the initial orientation of the second device then the two devices are determined to be facing each other and if the first device initial position relative to the second device initial position indicates that they are the specified distance apart then the combination of these two determinations confirms that the user of the first device has complied with the requested face off game convention.

For example, the game running on mobile device 105 compares the initial orientation of mobile device 105 obtained in step 705 to the initial orientation of mobile device 109 received in step 707 to determine that they are 180 degrees apart and directed towards each other and compares the initial position of mobile device 105 obtained in step 705 to the initial position of mobile device 109 received in step 707 to determine that mobile device 105 is located the specified distance from mobile device 109 then this confirms that game player 103 using mobile device 105 has complied with the requested face off game convention.

In step 711, the game running on the first device constructs a virtual world coordinate system for game play on the first device. In particular, in one embodiment a virtual world coordinate system is constructed within the first device with its origin at a bisected line between the first device's initial position in longitude and latitude and the second device's initial position in longitude and latitude.

For example, the game running on mobile device 105 constructs a virtual world coordinate system for game play on mobile device 105 where the virtual world coordinate system has its origin at a bisected line between mobile device 105 and mobile device 109. As such, in this example, the origin of the virtual world coordinate system constructed in mobile device 105 is located at the one-half meter mark along the one meter distance between mobile device 105 of game player 103 and mobile device 109 of game player 107 as they perform the face off game convention.

In optional step 713, the game running on the first device scales the virtual world coordinate system constructed for game play on the first device. In particular, in one embodiment the virtual world coordinate system constructed in the first device is scaled based on a captured image taken by the first device while the users perform the face off game convention. The difference between a calculated depth of the background (e.g., a wall behind the other player/device) and a calculated depth of the foreground (e.g., the other player) can be used to determine the bounds of play. This information can then be used to establish that each one unit of space in the game's virtual world coordinate system corresponds to one meter in the real world, for example. This step is optional, however, because assumptions can be made about the scale of play instead.

Referring now to FIGS. 8a and 8b, the interactive game play process will now be explained beginning with step 801 where the game running on the first device obtains a new position and orientation of the first device in the real world coordinate system from the sensors of the first device. For example, the game running on mobile device 105 obtains anew position and orientation of mobile device 105 from the sensors of mobile device 105 which is, again, based on game player 103's movement of mobile device 105 as may have occurred.

In step 803, the game running on the first device directs the first device to communicate the first device's new position and orientation to the second device. It is to be understood that this step is optional from the perspective of the first device although it is, of course, important to the second device's play. For example, the game running on mobile device 105 directs mobile device 105 to communicate the new position and orientation of mobile device 105 to mobile device 109.

In step 805, the game running on the first device obtains user input from the user of the first device. For example, the game running on mobile device 105 obtains input from game player 103's interaction with mobile device 105.

In step 807, the game running on the first device directs the first device to communicate the first device's user input to the second device. For example, the game running on mobile device 105 directs mobile device 105 to communicate game player 103's interaction with mobile device 105 to mobile device 109. It is to be understood that this step is optional from the perspective of the first device although it is, of course, important to the second device's game play.

In step 809, the game running on the first device receives from the second device the second device's new position and orientation in the real world coordinate system. As with the first device's new position and orientation obtained in step 801, this new position and orientation of the second device is caused by whatever movement of the first device has occurred. For example, the game running on mobile device 105 receives from mobile device 109 the new absolute position and orientation of mobile device 109 which, again, is based on game player 107's movement of mobile device 109.

In step 811, the game running on the first device receives from the second device the user input from the user of the second device. For example, the game running on mobile device 105 receives from mobile device 109 the input from game player 107's interaction with mobile device 109.

In step 813, the game running on the first device identifies any actions specified by the first device user input, obtained in step 805, and any actions specified by the second device user input, received in step 807, are to occur within the field of view of the display of the first device. For example, the game running on mobile device 105 determines what actions specified by mobile device 105's user input obtained in step 805 and what actions specified by mobile device 109's user input received in step 807 are to occur within the field of view of the display of mobile device 105.

In step 815, the game running on the first device displays on a display of the first device those actions determined in step 813 to be within the field of view of the display of the first device. For example, the game running on mobile device 105 displays on the display of mobile device 105 those actions determined in step 813 to be within a field of view of the display of mobile device 105.

Still referring to FIGS. 8*a* and 8*b*, the error reduction process will now be explained beginning with step 817 where the first device calculates a predicted new position and orientation of the first device based on saved past positions and orientations of the first device using any known technique such as extrapolation. For example, the game running on mobile device 105 calculates the predicted position and orientation of mobile device 105 by extrapolation based on saved past positions and orientations of mobile device 105.

In step 819, the game running on the first device calculates the first device sensor error as a difference between the predicted position and orientation of the first device calculated in step 817 and the new position and orientation of the first device obtained in step 801. For example, the game running on mobile device 105 calculates the sensor error of mobile device 105 as the difference between the predicted position and orientation of mobile device 105 calculated in step 817 and the position and orientation of mobile device 105 obtained in step 801.

In step 821, the game running on the first device directs the first device to communicate the first device's sensor error, calculated in step 819, to the second device. It is to be understood that this step is optional from the perspective of the first device although it is, of course, important to the second device's error reduction operation.

In step 823, the game running on the first device receives from the second device the calculated second device's sensor error. For example, the game running on mobile device 105 receives from mobile device 109 the calculated sensor error of mobile device 109.

In step 825, the game running on the first device sets as a worse case sensor error whichever is greater of the first device sensor error, as calculated in step 819, or the second device sensor error, as received in step 823. For example, the game running on mobile device 105 sets as a worse case sensor error whichever is greater of the sensor error of mobile device 105, as calculated in step 819, or the sensor error of mobile device 109, as received in step 823.

In step 827, the game running on the first device determines if the worse case sensor error has exceeded a predefined limit set in the game running on the first device. For example, the game running on mobile device 105 determines whether the worse case error of mobile device 105, as set in step 825, has exceeded a predefined limit set in the game running on mobile device 105. It is to be understood that meeting a predefine limit is considered the same as exceeding a predefined limit in that this determination is simply directed to the question of whether the worse case sensor error has yet reached a point where continued game play is problematic without going back and reconstructing the virtual world coordinate system within the mobile device.

In an alternative embodiment, steps 825 and 827 are combined into a single step where, instead of setting the worse case sensor error to be the greater of the sensor errors and then determining whether the worse case sensor error has exceeded a predefined limit, it is simply determined whether any of the sensor errors exceed a predefined limit.

If it is determined in step 827 that the worse case sensor error has exceeded the predefined limit then, in step 829, the game running on the first device prompts a game convention to reset or recalibrate the first device sensor thereby reducing the error. For example, if it was determined in step 827 that the worse case error of mobile device 105 exceeded a predefined limit set in the game running on mobile device 105 then the game running on mobile device 105 prompts a game convention in mobile device 105.

Various embodiments, variations and alternatives are intended to be covered by the present specification. For example, while described as a game device, mobile device smartphone, an iPhone from Apple Inc. is used in one embodiment, but an Android smartphone from Motorola or Goggle could also be used as could a Windows 7 cellular based cellular telephone from Microsoft. Essentially any mobile device having the appropriate sensors, processing, display and communications functions described herein can be used.

Similarly, the various described device communications can be performed using any known communications methodology including Bluetooth, wireless (WiFi), etc.

It is further to be understood that although the communications are described as discrete communications of one type of information between devices, in some embodiments such communications can be combined as desired to reduce the total number of required communications. For example, in one embodiment, communication steps 503 and 507 of FIG. 5 are combined as are communication steps 603 and 607 of FIG. 6. Further, some of the communications can be eliminated entirely in other embodiments when the information communicated is essentially redundant. For example, in one embodiment steps 501 and 503 of FIG. 5 are combined with steps 601 and 603 of FIG. 6 thus eliminating one or the other set of communication steps.

In an alternative embodiment involving more than two players who wish to participate in the interactive multiplayer augmented reality game, the virtual world is constructed with an origin not at a midpoint between two players performing a face off game convention and, instead, is constructed with the origin at the center of a polygon created by the lines formed between each respective player as they serially perform a face off game convention.

It is to be understood that the game generated targets can be any game generated element for user display or interaction including such elements as a bulls-eye, a monster, a zombie, a bad guy, an enemy, a villain, a vehicle, an aircraft, about, etc., or any other graphical user interface element such as a menu, a button, a slider, a switch, etc.

It is to be understood that although the description provided is directed to running a game for game play purposes, the approaches described herein are equally applicable to any other purpose where such sensor error and multiparty coordination and communication could be useful.

Further, while described as a game running on a mobile device, it is to be understood that the game itself, along with the ancillary functions such as sensor operations, device communications, user input and device display, etc., can all be implemented in software stored in a computer readable storage medium for access as needed to either run such software on the appropriate processing hardware or for purposes of installation and configuration on a mobile device.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A method performed by a first device operating in an interactive augmented reality game environment with a second device, the method comprising:
    constructing in the first device a virtual world coordinate system of the interactive augmented reality game environment, the virtual world coordinate system based on an initial position and orientation of the first device in a real world coordinate system obtained from sensors in the first device and an initial position and orientation of the second device in the real world coordinate system obtained from sensors in the second device and received in a communication from the second device to the first device, the initial position and orientation of the first device and the initial position and orientation of the second device each obtained while users of the first device and the second device perform a first game convention with each other;
    displaying on a display of the first device any first device actions and any second device actions occurring within a field of view of the display of the first device, the first device actions based on any user input information of the first device and a new position and orientation of the first device in the real world coordinate system obtained from sensors in the first device, the second device actions based on any user input information of the second device and a new position and orientation of the second device in the real world coordinate system obtained from sensors in the second device and received in a communication from the second device to the first device; and
    directing the user of the first device to perform a second game convention if a sensor error of the first device or a sensor error of the second device exceeds a predefined limit.

2. The method of claim 1 wherein the first game convention is a face off game convention.

3. The method of claim 2 wherein the face off game convention is combined with a countdown game convention.

4. The method of claim 1 wherein the second game convention is a figure 8 game convention.

5. The method of claim 1 wherein the second game convention is a countdown game convention.

6. The method of claim 1 wherein the second game convention is a spawn point game convention.

7. The method of claim 1 wherein the sensor error of the first device is the difference between a predicted position and orientation of the first device and the new position and orientation of the first device.

8. The method of claim 1 wherein the sensor error of the second device is the difference between a predicted position and orientation of the second device and the new position and orientation of the second device.

9. The method of claim 7 wherein the predicted position and orientation of the first device is extrapolated from past positions and orientations of the first device.

10. The method of claim 8 wherein the predicted position and orientation of the second device is extrapolated from past positions and orientations of the second device.

11. The method of claim 7 wherein the predicted position and orientation of the first device is extrapolated from past positions and orientations of the first device based on moving average of those past positions and orientations of the first device.

12. The method of claim 7 wherein the predicted position and orientation of the first device is extrapolated from past positions and orientations of the first device based on a moving average of a center of mass of those past positions and orientations of the first device.

13. The method of claim 8 wherein the predicted position and orientation of the second device is extrapolated from past positions and orientations of the second device.

14. The method of claim 8 wherein the predicted position and orientation of the second device is extrapolated from past positions and orientations of the second device based on a moving average of those past positions and orientations of the second device.

15. The method of claim 7 wherein the predicted position and orientation of the second device is extrapolated from past positions and orientations of the second device based on a moving average of a center of mass of those past positions and orientations of the second device.

16. The method of claim 1 wherein the predefined limit is based on a known average sensor error.

17. The method of claim 1 wherein the predefined limit is based on a combination of known average sensor errors of more than one sensor.

18. The method of claim 1 wherein the step of constructing in the first device the virtual world coordinate system is repeated at a game level change of the augmented reality game.

19. A non-transitory computer readable medium containing programming code executable by a processor, the programming code configured to perform a method in a first device operating in an interactive augmented reality game environment with a second device, the method comprising:
    constructing in the first device a virtual world coordinate system of the interactive augmented reality game environment, the virtual world coordinate system based on an initial position and orientation of the first device in a real world coordinate system obtained from sensors in the first device and an initial position and orientation of the second device in the real world coordinate system obtained from sensors in the second device and received in a communication from the second device to the first device, the initial position and orientation of the first device and the initial position and orientation of the second device, the initial position and orientation of the first device and the initial position and orientation of the second device each obtained while users of the first device and the second device perform a first game convention with each other;
    displaying on a display of the first device any first device actions and any second device actions occurring within a field of view of the display of the first device, the first device actions based on any user input information of the first device and a new position and orientation of the first device in the real world coordinate system obtained from sensors in the first device, the second device actions based on any user input information of the second device and a new position and orientation of the second device in the real world coordinate system obtained from sensors in the second device and received in a communication from the second device to the first device; and directing the user of the first device to perform a second game convention if a sensor error of the first device or a sensor error of the second device exceeds a predefined limit.

20. A method performed by a first device operating in an interactive augmented reality game environment with a second device, the method comprising:

directing a user of the first device to perform a first game convention wherein the first game convention is a face off game convention with a user of the second device;

obtaining an initial position and orientation of the first device in a real world coordinate system from sensors located in the first device;

receiving at the first device from the second device a communicated initial position and orientation of the second device in the real world coordinate system obtained from sensors located in the second device;

confirming performance by the user of the first device of the face off game convention by comparing the initial position and orientation of the first device to the initial position and orientation of the second device;

constructing in the first device a virtual world coordinate system of the interactive augmented reality game environment based on the initial position and orientation of the first device and the initial position and orientation of the second device;

obtaining a new position and orientation of the first device in the real world coordinate system from the sensors located in the first device;

obtaining user input information of the first device;

receiving at the first device from the second interactive game device a communicated new position and orientation of the second device in the real world coordinate system obtained from the sensors located in the second device;

receiving at the first device from the second device communicated user input information of the second device;

identifying any first device actions occurring within a field of view of the first device based on the new position and orientation of the first device and the user input information of the first device;

identifying any second device actions occurring within the field of view of the first device based on the new position and orientation of the first device and the user input information of the second device;

displaying on a display of the first device the identified first device actions occurring within the field of view of the first device and the identified second device actions occurring within the field of view of the first device;

calculating in the first device a predicted position and orientation of the first device in the real world coordinate system;

calculating as a sensor error of the first device a difference between the predicted position and orientation of the first device and the new position and orientation of the first device;

receiving at the first device from the second device a communicated sensor error of the second device;

directing the user of the first device to perform a second game convention if either the sensor error of the first device or the sensor error of the second device exceeds a predefined limit.

* * * * *